(No Model.)
C. RICHARDS.
MONKEY WRENCH.
No. 260,609. Patented July 4, 1882.
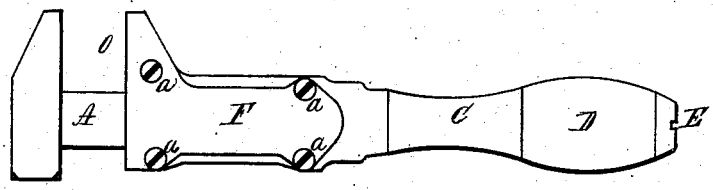
Fig 1.
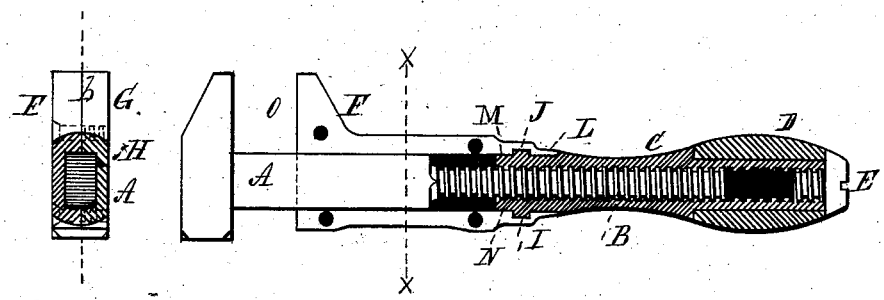
Fig 3.    Fig 2.
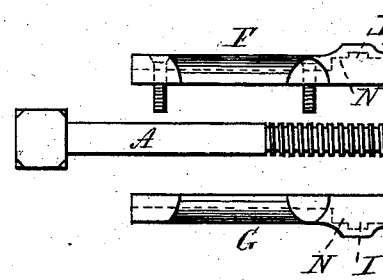    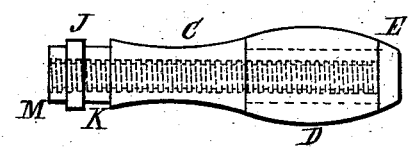
Fig 4.    Fig 5.
Witnesses.
Joseph H. Dow
J. H. Burridge
Inventor
C. Richards
W. H. Burridge, Atty.

UNITED STATES PATENT OFFICE.

CHARLES RICHARDS, OF CLEVELAND, OHIO.

MONKEY-WRENCH.

SPECIFICATION forming part of Letters Patent No. 260,609, dated July 4, 1882.

Application filed May 1, 1882. (No model.)

*To all whom it may concern:*

Be it known that I, CHARLES RICHARDS, of Cleveland, in the county of Cuyahoga and State of Ohio, have invented a certain new and Improved Monkey-Wrench; and I do hereby declare that the following is a full, clear, and complete description thereof.

My invention relates to certain improvements in monkey-wrenches; and it consists in the means employed for strengthening the shank and the manner of constructing and arranging the several parts together.

That the said improvement may be fully understood, reference will be had to the following specification and to the annexed drawings, making part of the same, in which—

Figure 1 is a view of the wrench; Fig. 2, a longitudinal section; Fig. 3, a cross-section in the line $x\,x$. Figs. 4 and 5 are details or sections which will be referred to in description.

Like letters of reference refer to like parts in the several views.

The general form of the wrench is as seen in Fig. 1, and consists of a central shank, A, provided with a screw-stem, B, which is threaded into the socket of the handle C, as seen in Fig. 2.

Around the lower part of the handle is a wood ring, D, secured in place by the set-screw E.

On each side of the shank A and stem B are side plates, F G, Figs. 3 and 4, which are fastened together by means of the set-screws $a\,a$, which pass through one plate and screw into the other, so that the said plates are held in close contact with the shank between them. This shank is loosely fitted in the rectangular shank-groove H, formed by the junction of the two halves of the groove in the side pieces, as seen in Fig. 3. The dividing-line of the groove H is indicated at $b$, which is the face of the side plates, F G. These plates are connected to one end of the handle by means of an annular groove, I, in which is loosely fitted the collar J, and the annular groove K in the shoulder L, and the point or end M in the shoulder N. In this way the end of the handle is inclosed between the two plates, as indicated in Fig. 2, and is so connected as to allow the handle to turn, at the same time preventing it from being drawn out from between the plates. On turning the handle the shank A is moved in and out by the action of the screws upon the stem, so as to open or contract the space O, according to the size of the nut, &c.

The side plates re-enforce the shank and give additional strength to that part of the implement which is subject to the greatest strain. These plates also protect the screws from injury and dirt, thereby causing the threads to work easily and to wear longer than in the ordinary way of exposing the threads.

I am aware that monkey-wrenches have been known and used with the stem threaded and screwed into the handle; but what distinguishes my invention is the side plates, in connection with the handle and shank, substantially as shown and described.

What I claim as my invention, and desire to secure by Letters Patent, is—

1. In a monkey-wrench, the side plates, F G, provided with a groove inclosing loosely the shank A, and so fastened together as to cover the sides and edges of said shank, arranged to slide within the groove by means of the screw-stem threaded into the handle, substantially as and for the purpose specified.

2. In a monkey-wrench, the side plates, F G, surrounding the shank and provided with a groove for said shank and attached to the handle by a jointed connection of an annular groove and collar, in combination with the shank and stem threaded into the handle, substantially as described, and for the purpose set forth.

In testimony whereof I affix my signature in presence of two witnesses.

CHARLES RICHARDS.

Witnesses:
C. NEFF,
J. H. BURRIDGE.